US012362449B2

(12) United States Patent
Rumer et al.

(10) Patent No.: US 12,362,449 B2
(45) Date of Patent: Jul. 15, 2025

(54) WAVEGUIDE TERMINATION STRUCTURE AND METHOD OF MANUFACTURE

(71) Applicant: Airbus Defence and Space Limited, Stevenage (GB)

(72) Inventors: Simon Rumer, Portsmouth (GB); Maurice Hamer, Portsmouth (GB); Stephen Clark, Portsmouth (GB)

(73) Assignee: AIRBUS DEFENCE AND SPACE LIMITED, Stevenage (GB)

(*) Notice: Subject to any disclaimer, the term of this patent is extended or adjusted under 35 U.S.C. 154(b) by 0 days.

(21) Appl. No.: 18/876,768

(22) PCT Filed: Jan. 20, 2023

(86) PCT No.: PCT/EP2023/051361

§ 371 (c)(1),
(2) Date: Dec. 19, 2024

(87) PCT Pub. No.: WO2024/008339

PCT Pub. Date: Jan. 11, 2024

(65) Prior Publication Data

US 2025/0174867 A1 May 29, 2025

(30) Foreign Application Priority Data

Jul. 8, 2022 (EP) .................................... 22183816

(51) Int. Cl.
*H01P 1/26* (2006.01)
*H01P 11/00* (2006.01)

(52) U.S. Cl.
CPC .............. *H01P 1/264* (2013.01); *H01P 11/00* (2013.01)

(58) Field of Classification Search
CPC .... H01P 1/264; H01P 1/24; H01P 1/26; H01P 1/262; H01P 1/222; H01P 1/28; H01P 3/12; H01P 11/00; H01P 11/002; H01P 11/001
USPC ........................................................ 333/22 R
See application file for complete search history.

(56) References Cited

U.S. PATENT DOCUMENTS

| | | | |
|---|---|---|---|
| 2018/0159236 | A1 | 6/2018 | Kroening |
| 2020/0274218 | A1 | 8/2020 | Ushijima et al. |

FOREIGN PATENT DOCUMENTS

| | | | |
|---|---|---|---|
| DE | 15 16 800 B1 | 1/1970 | |
| JP | S57-41005 A | 3/1982 | |
| JP | H05-218708 A | 8/1993 | |
| JP | H10-107507 A | 4/1998 | |

OTHER PUBLICATIONS

Beuerle Bernhard et al: "Micromachined Waveguides with Integrated Silicon Absorbers and Attenuators at 220-325 GHz", 2018 IEEE/MTT-S International Microwave Symposium—IMS, IEEE, Jun. 10, 2018 (Jun. 10, 2018), pp. 579-582, XP033388028, DOI: 10.1109/MWSYM.2018.8439364.
Mar. 24, 2023 Search Report issued in International Patent Application No. PCT/EP2023/051361; 4 pp.

(Continued)

*Primary Examiner* — Stephen E. Jones
(74) *Attorney, Agent, or Firm* — Nelson Mullins Riley & Scarborough LLP

(57) ABSTRACT

One or more load cells, for one or more corresponding radio-frequency waveguide terminations are provided. The load cells are integral with the structure by which they are to be fixed to the one or more waveguide terminations. Corresponding manufacturing methods are disclosed.

14 Claims, 9 Drawing Sheets

(56) References Cited

OTHER PUBLICATIONS

Mar. 24, 2023 Written Opinion of the International Searching Authority issued in International Patent Application No. PCT/EP2023/051361; 10 pp.
International Preliminary Report on Patentability dated Jan. 23, 2025 in PCT/EP2023/051361.

WAVEGUIDE TERMINATION STRUCTURE AND METHOD OF MANUFACTURE

CROSS-REFERENCE TO RELATED APPLICATIONS

This application claims priority to and is a 35 U.S.C. § 371 U.S. National Stage Application of International Application No. PCT/EP2023/051361, entitled "WAVEGUIDE TERMINATION STRUCTURE AND METHOD OF MANUFACTURE", filed Jan. 20, 2023, which claims priority to European Application No. 22183816.2, entitled "WAVEGUIDE TERMINATION STRUCTURE AND METHOD OF MANUFACTURE", filed Jul. 8, 2022, the contents of each being incorporated by reference herein in its entirety.

FIELD OF THE INVENTION

The present invention relates to waveguide termination, and particularly to the structure and method of manufacture of a radio-frequency (RF) load for waveguide terminations.

TECHNICAL BACKGROUND

In the field of satellite communications, in which electromagnetic signals travel through waveguides, it is often necessary to terminate a waveguide to prevent reflection of unwanted energy by the waveguide interface. FIG. 1 illustrates an example of a conventional waveguide termination 1. An unwanted RF signal, propagating through a waveguide 2 of a signal network, may be partially reflected back into the signal network on encountering an open interface 3 at the end of the waveguide, and such reflection is avoided through the use of a waveguide termination 1 which interfaces with the waveguide 2. Within the waveguide termination 1, an absorber material 4, absorbs energy of the incident RF signal and reduces its reflection back into the network. The waveguide 2 is thus considered to be terminated.

The packaging of waveguide terminations within a satellite payload presents some significant challenges. The terminations experience extreme conditions during operation, particularly high thermal flux when in use as an RF power absorber. For example, a termination must be able to tolerate the sudden application of an RF field and hence incur a significant thermal shock. The termination must also provide electrical isolation from the inside to outside in order to prevent unwanted signal radiation and, by reciprocity, must provide shielding from external signals. The termination must also be able to tolerate rapid de-pressurisation and the harsh vibration environment experienced during the ascent of the satellite during its launch phase, particularly at lift-off. The termination is subjected to the extreme variations in temperature that are experienced in space, particularly when the satellite passes into solar eclipse during its orbit and must be able to tolerate the twice-daily thermal shock experienced by the satellite crossing the solar terminator during its operational lifetime. This equates to approximately 11,000 cycles for a typical 15-year geostationary mission and up to 60,000 cycles for satellites operating in polar or highly elliptical orbits.

As shown in FIG. 1, existing techniques for realising waveguide terminations, including those used within satellite payloads, often make use of an absorber material 4, also referred to herein as a 'load cell', that is bonded to a surrounding structure 5. The absorber 4 must be able to absorb incident RF energy by dissipating it through the surrounding structure 5 as heat via a bonding material 6 between the absorber 4 and the structure 5. Materials which are typically used to ensure that the bonding is sufficiently secure, particularly given the requirements to operate in space as described above, have a high thermal resistance, which limits the thickness of the bonding material which can be used for a given thermal dissipation requirement. The choice of bonding material 6 therefore represents a design restriction, leading to a more complex manufacturing process to ensure that the required bonding can be achieved. Since the thermal conductivity of a typical bonding material is relatively low, compared with the outer structure of the waveguide termination (typically metallic), the bonding material 6 effectively forms a 'bottleneck' in the thermal dissipation away from the load cell 4.

It is an aim of embodiments of the present invention to improve the ability of a waveguide termination to absorb incident RF energy. This is achieved by providing one or more load cells, for one or more corresponding waveguide terminations, that are integral with the structure by which they are to be fixed to the one or more waveguide terminations. Embodiments of the present invention can make use of additive 20 manufacturing (AM) to manufacture such integral structures, referred to herein as 'RF loads'.

A significant advantage of embodiments of the present invention is that there is not a need to use a thermally conductive adhesive to secure the position of the load cell, in contrast to conventional configurations. In addition to improving performance of the RF load, the complexity of its manufacture is reduced. Further advantages will become apparent from the following description of the embodiments of the present invention.

SUMMARY OF INVENTION

According to an aspect of the present invention there is provided a radio frequency, RF, load for a waveguide termination, comprising a load cell for absorbing incident RF energy, a backing plate configured to absorb the RF energy propagating through the load cell, wherein the backing plate is further configured to fix the load cell to a housing of the waveguide termination, and wherein the backing plate is integral with the load cell.

The load cell may taper along the longitudinal axis.

The backing plate and the load cell may share a plane and wherein the load cell is tapered to the shared plane.

The load cell and backing plate may comprise a ceramic material.

The ceramic material may be silicon carbide.

The RF load may further comprise at least one additional load cell, wherein the at least one additional load cell is integral with the backing plate.

According to another aspect of the present invention there is provided a waveguide termination for terminating a radio frequency, RF, waveguide comprising the above RF load, a housing comprising an interior channel to guide RF energy from the waveguide, and an interface for coupling to the waveguide, wherein the backing plate of the RF load is fastened to the housing such that the load cell is in communication with the interior channel.

According to another aspect of the present invention there is provided a multi-waveguide termination for terminating a plurality of radio frequency, RF, waveguides comprising the above RF load, a housing comprising a plurality of interior channels each arranged to guide RF energy from a respective waveguide, and an interface for coupling to the plurality of waveguides, wherein the backing plate of the RF load is fastened to the housing such that each respective load cell is in communication a respective interior channel.

According to another aspect of the present invention there is provided a waveguide termination comprising the above RF load, a housing comprising an interior channel to guide RF energy from the waveguide, and an interface for coupling to the waveguide, wherein the RF load is integral with the housing, arranged such that the load cell is in communication with the interior channel.

According to another aspect of the present invention there is provided a multi-waveguide termination comprising the above RF load, a housing comprising a plurality of interior channels each arranged to guide RF energy from a respective waveguide, an interface for coupling to the plurality of waveguides, wherein the RF load is integral with the housing, arranged such that the each respective load cell is in communication with a respective interior channel.

According to another aspect of the present invention there is provided a method of manufacturing a radio frequency, RF, load for a waveguide termination, the RF load comprising a load cell for absorbing incident RF energy, a backing plate configured to absorb the RF energy propagating through the load cell, wherein the backing plate is further configured to fix the load cell to a housing of the waveguide termination, the method comprising integrally forming the load cell with the backing plate.

According to another aspect of the present invention there is provided a method of manufacturing a radio frequency, RF, load for a multi-waveguide termination, the RF load comprising a plurality of load cells for absorbing incident RF energy, a backing plate configured to absorb the RF energy propagating through the load cells, wherein the backing plate is further configured to fix the load cells to a housing of the waveguide termination, the method comprising integrally forming the plurality of load cells with the backing plate.

According to another aspect of the present invention there is provided a method of manufacturing a waveguide termination, the waveguide termination comprising one or more load cells for absorbing incident RF energy, a backing plate configured to absorb the RF energy propagating through the load cells, a housing comprising one or more interior channels to guide RF energy from the waveguide, an interface for coupling to one or more waveguides, the method comprising integrally forming the one or more load cells with the backing plate and the housing, such that the respective one or more load cells are in communication with a respective interior channel.

The integral formation of the above methods may be achieved through additive manufacture.

DETAILED DESCRIPTION

Figure 2:
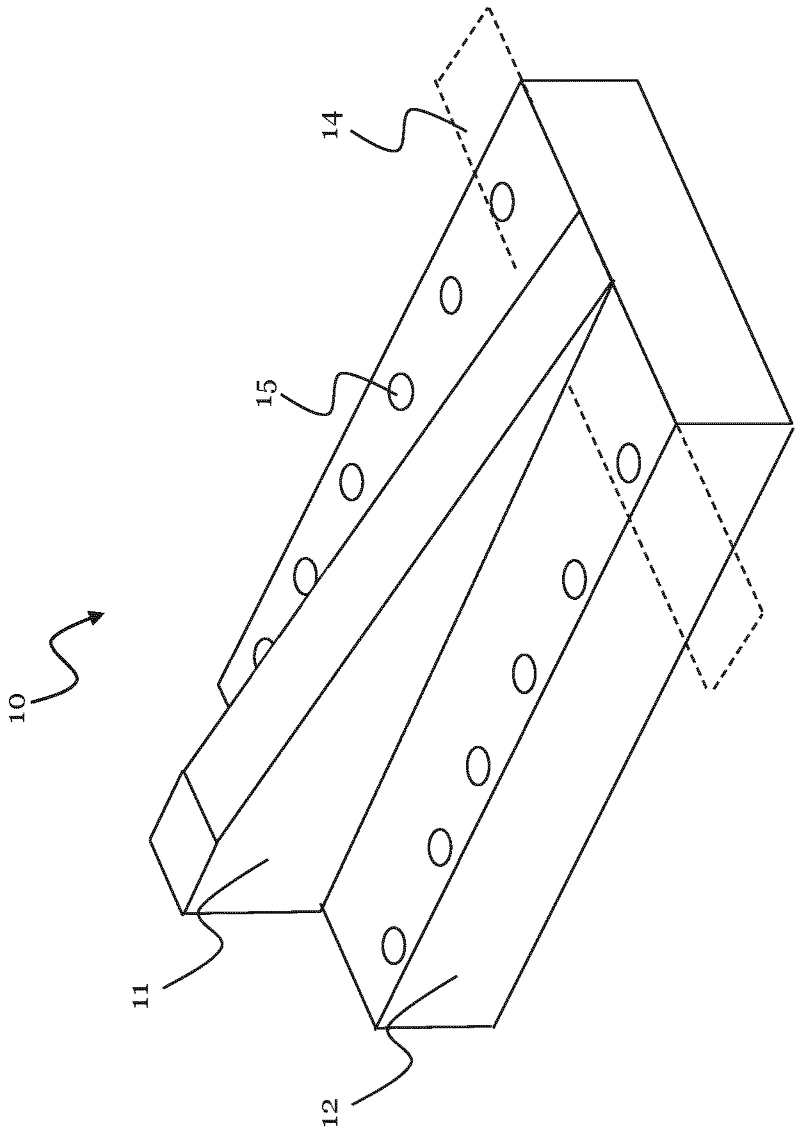
FIG. 2 shows an RF load, according to embodiments of the present invention.

FIG. 2 shows a schematic of a radio frequency (RF) load 10 for use in a waveguide termination. The RF load 10 is comprised of a load cell 11 and a backing plate 12, which are integral with one another. The backing plate 12 forms a portion of the housing of a structure, which is referred to herein as the waveguide termination, which is to be coupled to a waveguide which is to be terminated. The integral formation with a backing plate 12 precludes the need for the fitting of an RF load cell into a conventional waveguide termination using thermally conductive adhesive, which would otherwise limit its performance in the manner described above.

The load cell 11 is constructed to absorb incident RF energy, and dissipate such energy into the backing plate 12. The backing plate 12 has a thickness configured in accordance with the expected incident energy level, and the dimensions of the housing a waveguide termination, described in more detail below.

In some embodiments, the load cell 11 has a longitudinal axis and the thickness of the load cell tapers, relative to a plane 14 shared by the backing plate 12 and the load cell 11. FIG. 2 illustrates an example of such a plane 14, which can be considered as representing the position of the delineation between the backing plate 12 and the load cell 11, if the backing plate 12 and load cell 11 were to be considered as discrete components. The shape of the region of the RF load 10 which represents the backing plate 12 has a surface from which the region of the RF load which represents the load cell 11 protrudes, and the plane 14 shared by the backing plate 12 and the load cell 11 corresponds to the plane of the surface of the backing plate 12.

In the embodiments illustrated, the tapered profile is uniform, the thickness of the load cell 11 reducing linearly with distance along the longitudinal axis. The tapered profile of the load cell 11 enables gradual, controlled absorption of RF energy by reducing reflection of the incident energy of the RF signal along the incident path by reducing the angle of incidence of the RF signal on the load cell 11 surface. In alternative embodiments, the load cell 11 may taper in a non-uniform manner along the longitudinal axis.

Figure 1:
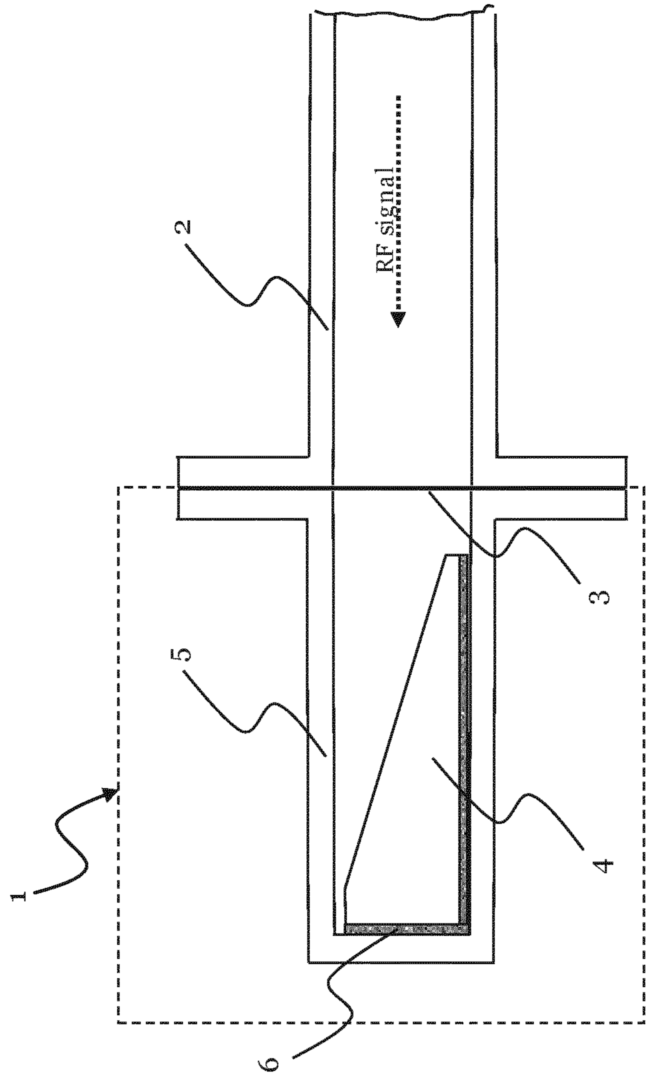
FIG. 1 shows an example of a conventional RF waveguide termination.

In some embodiments, such as that exemplified by FIG. 2, such tapering may be such that the load cell 11 is tapered fully to the plane 14 shared by the backing plate 12 and the load cell 11, reducing the reflection of the energy from the load cell 11. Typically, in conventional designs, such load cell tapering is not utilised. Instead, as can be seen from FIG. 1, conventional designs include load cells that taper to a region of non-zero thickness, or a “step”. The step is included in conventional designs because without it, the RF load cell would be prone to fracturing during when handled during assembly of the waveguide termination. However, such a step would cause some of the incident RF energy to be reflected back into signal network, hence reducing the quantity of RF energy that may be absorbed by the load cell. As such, tapering the load cell 11 to the plane 14, in embodiments of the present invention, enables a greater level of RF absorption for the RF load when compared to conventional designs by reducing the quantity of reflected RF energy. The step is not required as the load cell 11 is integral with the backing plate 12. The load cell 11 does not need to be handled independently of the backing plate 12.

The integral formation of the load cell 11 and the backing plate 12 enables more effective absorption of RF energy compared to that which is possible using conventional load cells. This is achieved in particular by dissipating the thermal energy from the load cell 11 directly into the backing plate 12 without the need for a bonding material, while positioning of the load cell 11 is ensured via its integration with the backing plate 12.

Figure 8:
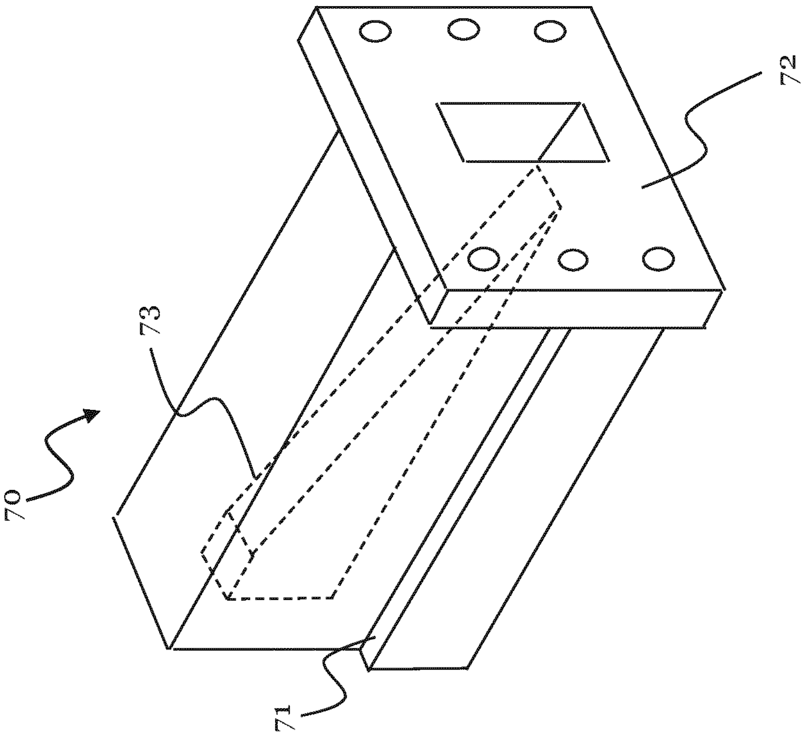
FIG. 8 shows a waveguide termination in which the RF load is integral with the housing, according to embodiments of the present invention.
Figure 9:
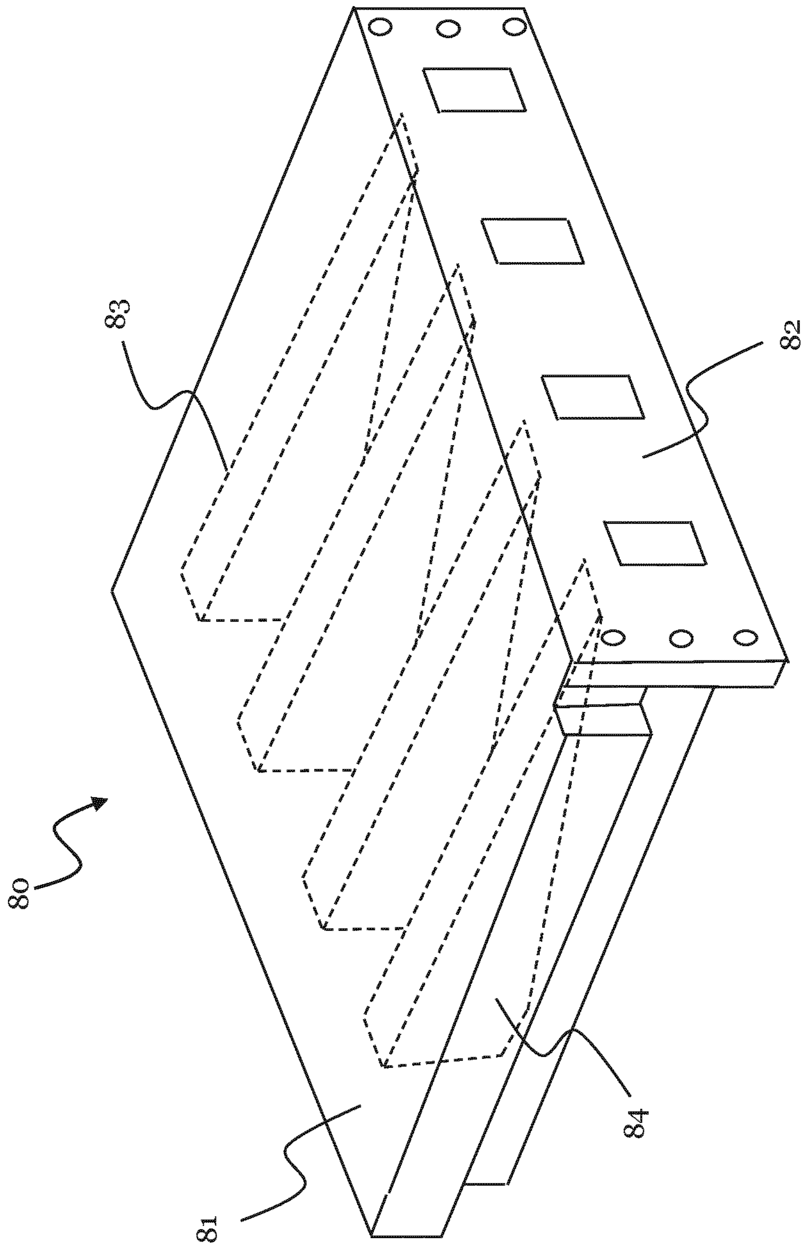
FIG. 9 shows a multi-waveguide termination in which the RF load is integral with the housing, according to embodiments of the present invention.

The term 'integral', as referred to in relation to embodiments of the present invention, is used to refer to a single-body structure. The parts of the single-body structure can be defined as portions or regions of the single body. In contrast, a multi-body structure is referred to herein as being assembled from those parts as physically separate components. In FIG. 2, and also FIG. 5 described below, portions of a single-body are illustrated as discrete components to facilitate explanation and reference to each portion, but it will be appreciated that the illustrated delineation between such components does not represent assembly of separate components. No delineation between a load cell and a backing plate is shown in FIGS. 8 and 9.

Formation of an RF load 10 comprising an integral load cell 11 and backing plate 12 can be achieved using various methods according to embodiments of the present invention, which lead to the production of a single-body structure. For example, additive manufacturing (AM) techniques, based on one or more configuration files, may be used in some embodiments in which the load 10 or termination is constructed through deposition of successive layers of material.

The load cell 11 may be composed of any suitable RF absorbing material. In some embodiments, the load cell 11 and backing plate 12 are composed of a ceramic material, and such ceramic materials are particularly suitable for high power applications in which a large amount of RF energy is to be absorbed. For example, such ceramic material may comprise silicon carbide. In alternative embodiments, the load cell 11 and backing plate 12 are composed of a resin, which is an effective material for lower power applications, and which provides structural robustness.

Figure 3:
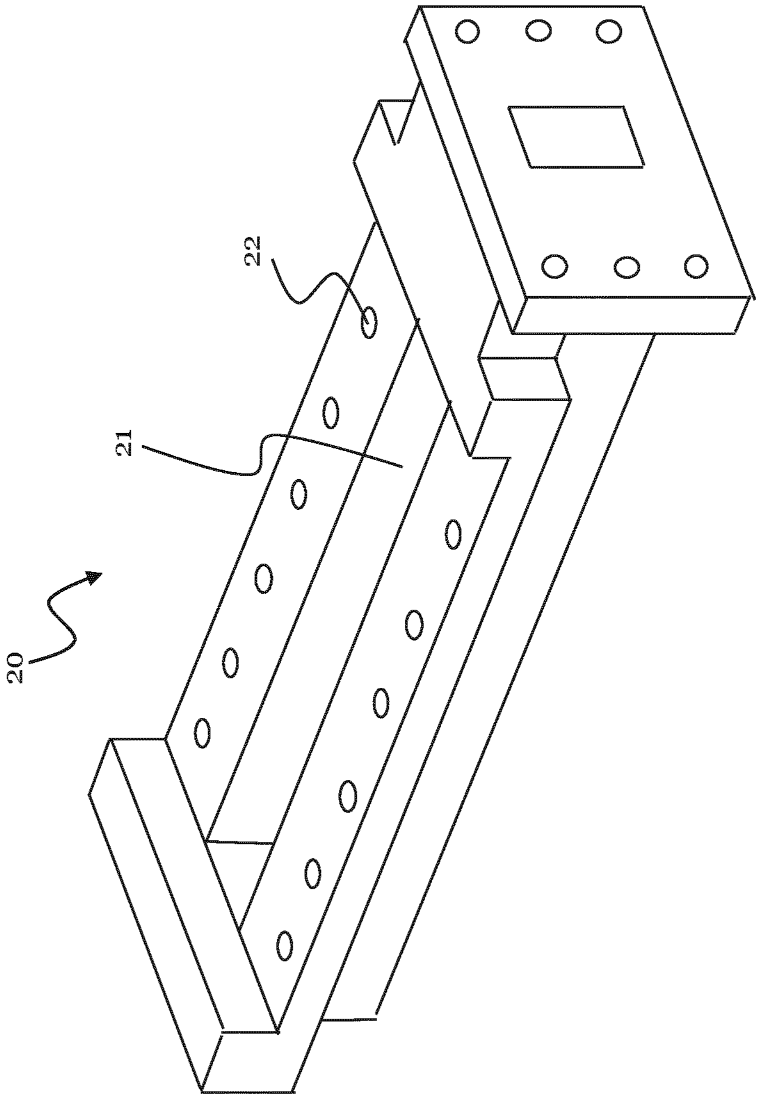
FIG. 3 shows a housing of a waveguide termination, according to embodiments of the present invention.

FIG. 3 shows a housing 20 of a waveguide termination according to embodiments of the present invention, to which the RF load 10 of FIG. 2 may be fastened, via the backing plate 12. In some embodiments, this is achieved by the formation of recesses 15 in the backing plate 12, through which a nut and bolt assembly may fit into recesses 22. Alternatively, or additionally, fixing may be achieved through the utilisation of thermal paste used as an adhesive to fix the RF load 10 to the housing 20. Further fixing mechanisms, falling within the scope of the claims, will be apparent to those skilled in the art.

The housing 20 is arranged such that it houses an interior channel 21 for receiving incident RF energy. The load cell 11 is accommodated by the channel 21, to absorb incident RF energy in the channel 21. In the configuration illustrated in FIG. 3, the exterior of the housing 20 defines three external sides of a waveguide termination having a substantially rectangular cross-section, with the fourth side being defined by the backing plate 12 of the RF load 10. As such, the thickness of the backing plate 12 may be so as to correspond substantially to the thickness of the housing 20 of the waveguide termination. In some embodiments, the backing plate 12 of the RF load 10 may form the entirety of the fourth side, but in alternative embodiments, the backing plate 12 may be inserted into a gap or slot within a portion of the fourth side of the housing 20.

Figure 4:
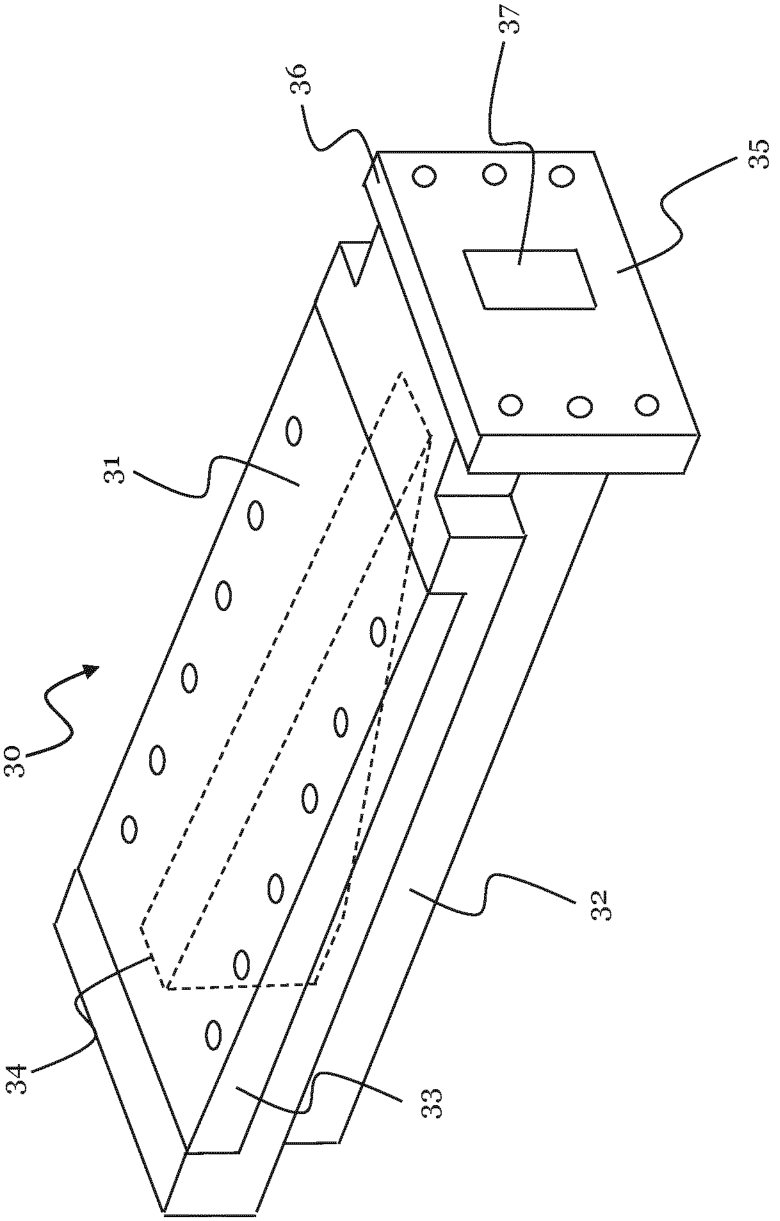
FIG. 4 shows a waveguide termination comprising an RF load and a housing of a waveguide termination, according to embodiments of the present invention.

FIG. 4 shows a waveguide termination 30, comprising the RF load 31 of FIG. 2 and the housing 32 of FIG. 3, according to embodiments of the present invention. The waveguide termination 30 is formed by fixing the RF load 31 to the housing 32, using the backing plate 33, such that the load cell 34 is in communication with the channel of the housing 30. The fixing may be achieved in any of the manners described above.

The waveguide termination 30 further comprises an interface 35 and a closed end, at opposing ends of the interior channel of the housing 30. The interface comprises a fastening portion 36 and an opening 37. The fastening portion 36 is, in embodiments of the present invention, a flange arranged to be secured to a corresponding flange of a waveguide to be terminated, such that RF energy from the waveguide may propagate through the opening 37 into the interior channel of the waveguide termination 30. The closed end of the waveguide termination prevents further propagation of RF energy along the longitudinal axis of the waveguide termination 30.

The housing 32 of the waveguide termination 30, when coupled with the RF load 31, forms the waveguide termination 30 of FIG. 4 capable of absorbing incident RF energy received from the further waveguide coupled to the interface 35. In this manner, the further waveguide is terminated.

In some embodiments the width of the load cell 34 is arranged such that when inserted into the channel, it fills the width of the channel. In some embodiments, the load cell 34 does not extend along the entire length of the channel. In such embodiments, an area of the backing plate 33 from which the load cell 34 does not protrude is exposed to the channel and may be plated with an RF reflective material, such that RF energy is guided through the waveguide termination 30 until it reaches the load cell 34.

Figure 5:
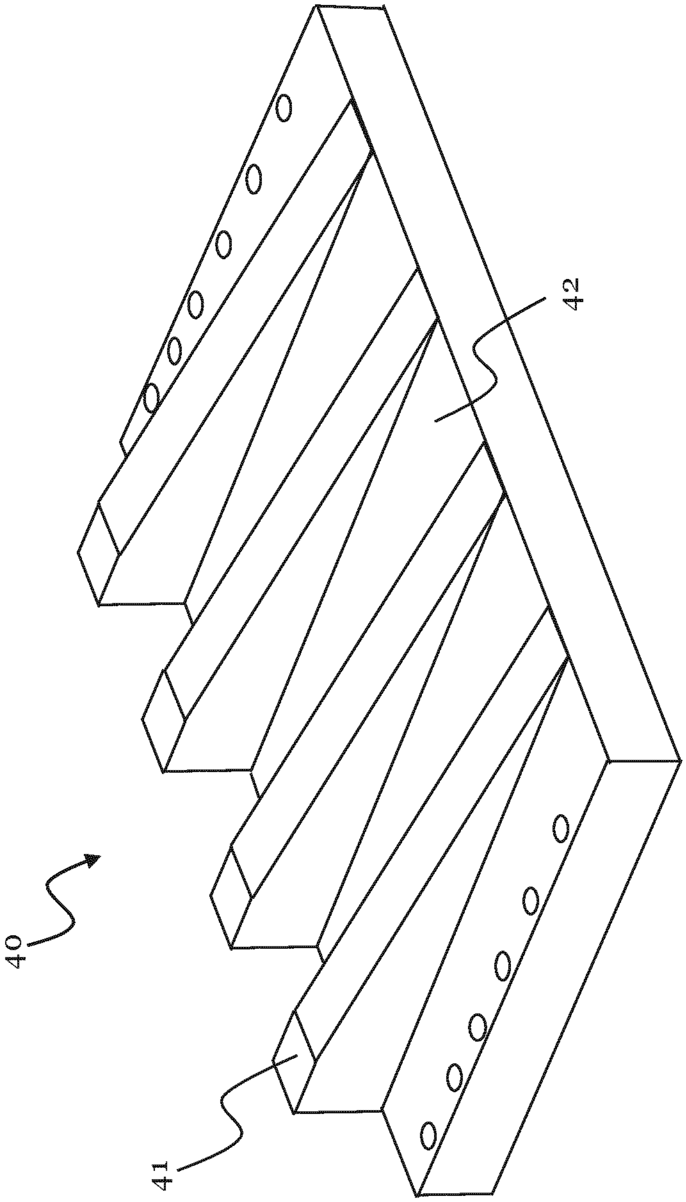
FIG. 5 shows an RF load with multiple load cells integral with a single backing plate, according to embodiments of the present invention.

FIG. 5 shows a schematic of an RF load 40 for a waveguide termination according to further embodiments of the present invention. The RF load 40 is comprised of a plurality of load cells 41 and a backing plate 42, where each of the plurality of load cells 41 is integral with the single backing plate 42. The integral formation precludes the need for the fitting of each RF load cell 41 into an individual waveguide using thermally conductive adhesive. Each load cell 41 is integrated with the backing plate 42 in a manner analogous to that described in relation to FIG. 2 above.

Each load cell 41 is constructed to absorb incident RF energy from a respective waveguide, and to dissipate such RF energy into the backing plate 42. In the embodiments represented by FIG. 5, each load cell 41 has the same structure as each other, but in alternative embodiments, variations may exist between the structures of each load cell 41 to in anticipation of, for example, differing RF energies to be received from each of the respective waveguides to be terminated. The structural variations may include differences in the tapering profile, such as the tapering angle, the length of the load cell 41 along the longitudinal axis, and the material of the load cell 41. Further, the shape of the load cell 41, for example its width, may depend on the shape of the waveguide to be terminated. It is to be noted that although such variations are described herein with reference to the multi-load cell RF load 40 of FIG. 5, the same design considerations apply to the embodiments of FIG. 2, in terms of selection of appropriate load cell shape, structure and material.

Figure 6:
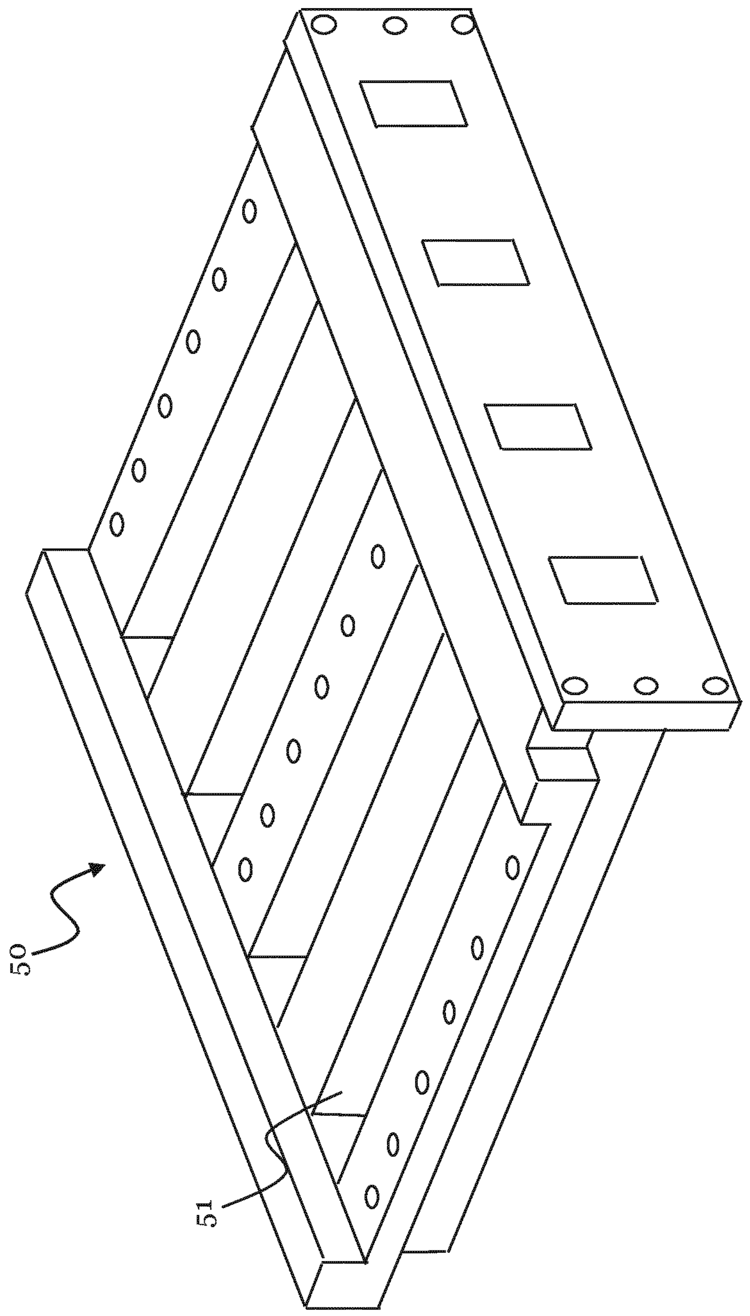
FIG. 6 shows housing for a waveguide termination with multiple channels each arranged to accommodate a respective load cell, according to embodiments of the present invention.

The backing plate 42 is configured to fix the RF load 40 to a housing of a waveguide termination, such as the housing 50 shown in FIG. 6. This may be achieved in a manner analogous to that described with reference to FIG. 3.

FIG. 6 shows a housing 50 to which the RF load 40 of FIG. 5 may be fastened, via the backing plate 42, according to embodiments of the present invention. The housing 50 is arranged such that a plurality of interior channels 51 are present, each of which accommodates a respective one of the plurality of load cells 41. Correspondingly, the exterior of the housing 50 defines three external sides of each of a plurality of termination portions of a waveguide termination, in which each of the plurality of termination portions have a substantially rectangular cross-section, with the fourth side being defined by the backing plate 42.

Figure 7:
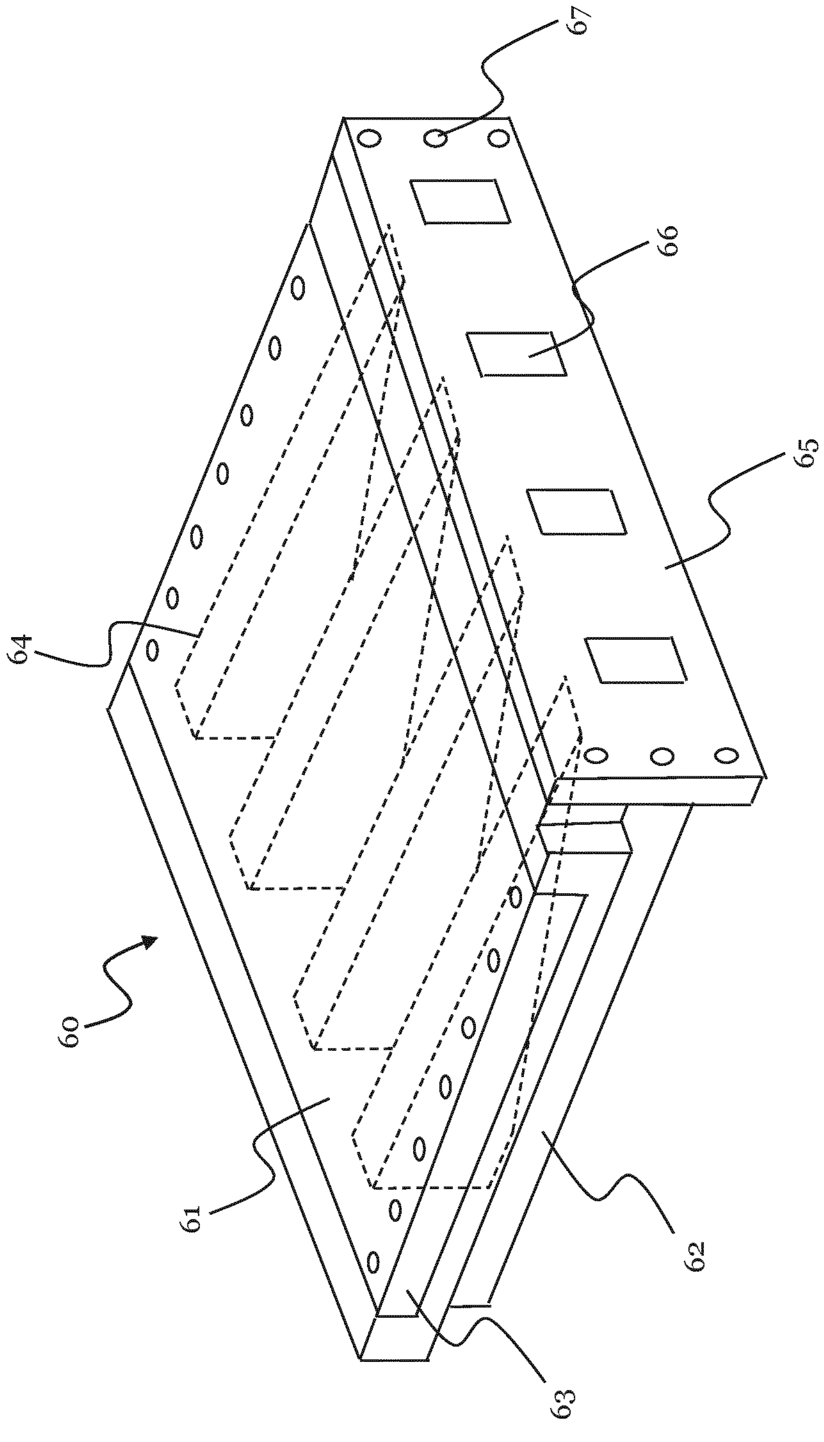
FIG. 7 shows multi-waveguide termination, according to embodiments of the present invention.

FIG. 7 shows a multi-waveguide termination 60, comprising the RF load 61 of FIG. 5 and the housing 62 of FIG. 6, according to embodiments of the present invention. The waveguide termination is formed by fixing the RF load 61 to the housing 62, using the backing plate 63, such that each of the plurality of load cells 64 is in communication with a respective one of the plurality of interior channels of the housing. The fixing may be achieved in any of the manners described above.

The waveguide termination 60 may be fastened to a plurality of further waveguides, using the interface 65 of the housing. When fastened to a the plurality of further waveguides, the waveguide termination 60 is arranged such that RF energy propagating in each of the further waveguides may pass through a respective one of the plurality of openings 66 of the housing 62, into the termination 60 and subsequently be absorbed by a respective one of the plurality of load cells 64. In so doing, a plurality of waveguides are terminated. Further, as the backing plate 63 is integral with the plurality of load cells 64, the load cells 64 are able to dissipate absorbed RF energy into the backing plate 63, without using a thermal adhesive as an intermediary.

The waveguide termination 60 further comprises an interface 65 and a closed end, at opposing ends of each channel. The interface 65 comprises a fastening portion 67 and a plurality of openings 66. The fastening portion 67 is arranged to be secured to a plurality of further waveguides such that a plurality of signals may propagate through a respective one of the plurality of openings into the waveguide termination 60.

It is noted that although FIGS. 5-7 show a four-way load, housing and termination respectively, these are considered as example embodiments only. It will be appreciated that any number of load cells may formed integrally with a single backing plate and fitted to a corresponding housing to produce an N-way waveguide termination, capable of termination a plurality of signals propagating through N waveguides.

The provision of multiple openings 66 within a single fastening portion or flange enables uniform coupling of each of a plurality of waveguides to the waveguide termination 60 via a coupling mechanism to each of the plurality of waveguides.

FIG. 8 shows a waveguide termination 70 according to further embodiments of the present invention. The waveguide termination 70 comprises a housing 71, an interface 72 and an RF load 73, wherein the RF load 73 is integral with the housing 71, in contrast to the multi-body embodiments illustrated with reference to FIG. 4 in which the RF load need not be integral with the housing. The RF load 73 may be substantially similar to that described with reference to FIG. 1 comprising a load cell and a backing plate, while the housing 71 may be substantially similar to that described with reference to FIG. 2. The load cell of the RF load 73 is integral with the backing plate of the RF load 73, which is in turn integral with the housing 71 and therefore forms a portion of the housing 71.

In the embodiment of FIG. 8, it is not necessary to fix the RF load 72 to the housing 71 via a fastening means. Efficiency of manufacture may be increased, and the RF load 73 and housing 71 may be designed in a common configuration file to be used in, for example, an additive manufacturing process.

FIG. 9 shows a multi-waveguide termination 80 according to further embodiments of the present invention, comprising a housing 81, an interface 82 and an RF load 83, wherein the RF load 83 is integral with the housing 81 and the RF load 83 comprises a plurality of load cells 84 integral with a single backing plate (not shown as a discrete component in FIG. 9, due to its integration with housing 81). The RF load 83 may be substantially similar to that described with reference to FIG. 5, while the housing 81 may be substantially similar to that described with reference to FIG. 6. The waveguide termination 80 contrasts from the multi-body waveguide termination of FIG. 7 in which the RF load need not be integral with the housing.

In the arrangement of FIG. 9, it is not necessary for the RF load 83 to be fixed to the housing 81 via a fastening means. Efficiency of manufacture may be increased, and the RF load and housing may be designed in a common configuration file to be used in, for example, an additive manufacturing process.

It is noted that although FIG. 9 shows a four-way termination, it is considered as example embodiment only. It will be appreciated that any number of load cells may formed integrally with a single backing plate and housing to produce an N-way waveguide termination, capable of termination a plurality of signals propagating through N waveguides.

According to further embodiments of the present invention, there is provided a method of manufacturing an RF load for a waveguide termination, as described with reference to FIG. 2. The method comprises integrally forming the load cell with the backing plate. The method may include additive manufacturing in some embodiments.

According to further embodiments of the present invention, there is provided a method of manufacturing an RF load for a waveguide termination, as described with reference to FIG. 5. The method comprises integrally forming the plurality of load cells with the backing plate.

According to further embodiments of the present invention, there is provided a method of manufacturing a waveguide termination according to FIG. 8 or FIG. 9. The method comprises integrally forming one or more load cells with the backing plate and the housing, such that the respective one or more load cells are in communication with a respective interior channel. The method may include additive manufacturing in some embodiments.

In some embodiments, the integral formation of the one or more load cells, the backing plate and the housing employs a ceramic material to define the overall structure of the waveguide termination. A further step of coating the interior of the one or more channels within the housing with reflective material, such as metal, is performed in order to provide the channel with the ability to guide incident RF energy to the load cell. This coating step may be part of an additive manufacturing process, or may alternatively be a deposition process.

It will be appreciated that a number of modifications to the embodiments described above are possible which fall within the scope of the claims. For example, the embodiments are described in relation to termination of waveguides having a rectangular cross-section, but it is also possible to apply the principles disclosed herein to waveguides of other shapes, such as elliptical cross-sections, using appropriately-shaped backing plates and load cells. The specific nature of the load cell and backing plate will be dependent upon particular applications and the nature of the waveguide to be terminated, and the RF energy to be absorbed.

The invention claimed is:

1. A multi-waveguide termination, comprising:

a radio frequency, RF, load comprising:

a plurality of load cells for absorbing incident RF energy; and a backing plate configured to absorb the RF energy propagating through the plurality of load cells, wherein the backing plate is integral with the plurality of load cells:

a housing comprising a plurality of interior channels each arranged to guide RF energy from a respective waveguide; and an interface for coupling to the plurality of waveguides:

wherein the backing plate of the RF load is fixed to the housing such that the load cell is fixed to the housing, and each interior channel accommodates a respective load cell of the plurality of load cells.

2. The multi-waveguide termination of claim 1, wherein each of the plurality of load cells has a longitudinal axis and wherein each load cell is tapered along its respective longitudinal axis.

3. The multi-waveguide termination of claim 2, wherein the backing plate and each of the plurality of load cells share a plane and wherein each of the plurality of load cells is tapered to the shared plane.

4. The multi-waveguide termination of claim 1, wherein the plurality of load cells and the backing plate comprise a ceramic material.

5. The multi-waveguide termination of claim 4, wherein the ceramic material is silicon carbide.

6. A multi-waveguide termination comprising:

a radio frequency, RF, load, comprising:

a plurality of load cells for absorbing incident RF energy; and a backing plate configured to absorb the RF energy propagating through the plurality of load cells, wherein the backing plate is integral with the plurality of load cells:

a housing comprising a plurality of interior channels each arranged to guide RF energy from a respective waveguide; and an interface for coupling to the plurality of waveguides;

wherein the RF load is integral with the housing, arranged such that each interior channel accommodates a respective load cell of the plurality of load cells.

7. The multi-waveguide termination of claim 6, wherein each of the plurality of load cells has a longitudinal axis and wherein each load cell is tapered along its respective longitudinal axis.

8. The multi-waveguide termination of claim 7, wherein the backing plate and each of the plurality of load cells share a plane and wherein each of the plurality of load cells is tapered to the shared plane.

9. The multi-waveguide termination of claim 6, wherein the plurality of load cells and the backing plate comprise a ceramic material.

10. The multi-waveguide termination of claim 9, wherein the ceramic material is silicon carbide.

11. A method of manufacturing a radio frequency, RF, multi-waveguide termination, the multi-waveguide termination comprising:

an RF load comprising:

a plurality of load cells for absorbing incident RF energy; and a backing plate configured to absorb the RF energy propagating through the plurality of load cells:

a housing comprising a plurality of interior channels each arranged to guide RF energy from a respective waveguide of a plurality of waveguides; and an interface for coupling to the plurality of waveguides;

the method comprising:

integrally forming the plurality of load cells with the backing plate; and fixing the backing plate of the RF load to the housing such that the load cell is fixed to the housing, and each interior channel accommodates a respective load cell of the plurality of load cells.

12. The method of claim 11, wherein the integral formation is achieved through additive manufacture.

13. A method of manufacturing a multi-waveguide termination, the waveguide termination comprising:

an RF load comprising:

a plurality of load cells for absorbing incident RF energy; and a backing plate configured to absorb the RF energy propagating through the plurality of load cells;

a housing comprising a plurality of interior channels each configured to guide RF energy from a respective waveguide;

an interface for coupling to a plurality of waveguides;

the method comprising:

integrally forming the plurality of load cells with the backing plate and the housing, such that each interior channel accommodates a respective load cell of the plurality of load cells.

14. The method of claim 13, wherein the integral formation is achieved through additive manufacture.

* * * * *